(No Model.)
E. WALTER.
CORN PLANTER.
No. 435,909. Patented Sept. 2, 1890.
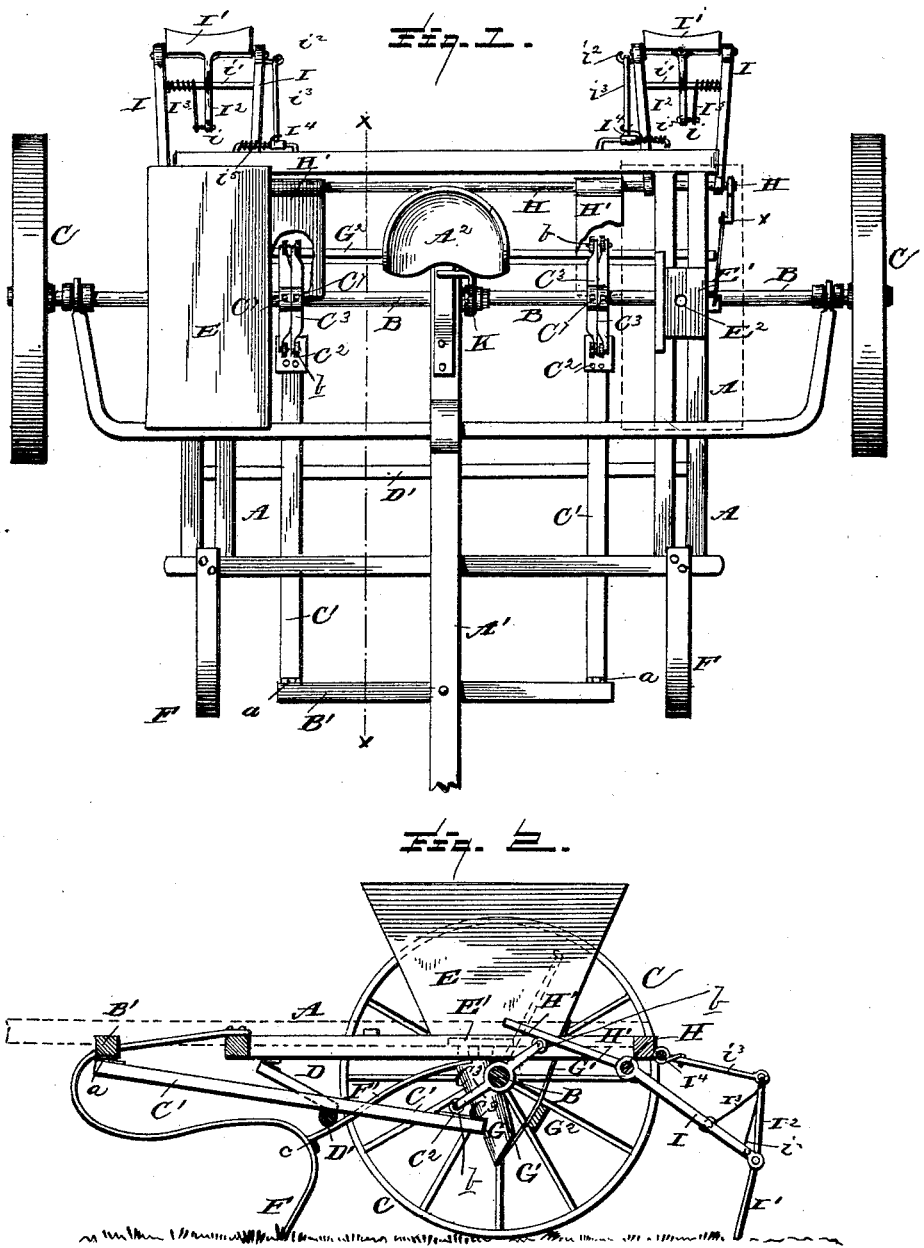
Witnesses
L. C. Hills
E. A. Bond
Inventor
Edward Walter
E. B. Stocking
Atty.

UNITED STATES PATENT OFFICE.

EDWARD WALTER, OF KEYTESVILLE, MISSOURI, ASSIGNOR OF ONE-HALF TO E. W. PRICE, OF SAME PLACE.

CORN-PLANTER.

SPECIFICATION forming part of Letters Patent No. 435,909, dated September 2, 1890.

Application filed December 14, 1889. Serial No. 333,720. (No model.)

*To all whom it may concern:*

Be it known that I, EDWARD WALTER, a citizen of the United States, residing at Keytesville, in the county of Chariton, State of Missouri, have invented certain new and useful Improvements in Corn-Planters, of which the following is a specification, reference being had therein to the accompanying drawings.

This invention relates to certain new and useful improvements in planters; and it has for its object, among others, to provide simple and efficient means for opening the furrow, dropping the seed, and covering the same. The novelty in the present instance resides in the peculiar combinations, and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a top plan of a planter embodying my invention. Fig. 2 is a longitudinal section thereof on the line $x\ x$ of Fig. 1.

Like letters of reference indicate like parts throughout the two figures of the drawings.

Referring now to the details of the drawings by letter, A designates the main frame, B the axle, and C the wheels.

A' is the pole, and A² the driver's seat.

B' is a cross-piece secured to the pole forward of the cross-bar of the main frame, and to the ends of this cross-piece B' are hinged, as at $a$, the forward ends of the bars C', which at their rear ends are provided with the plates C², secured thereto in any suitable manner.

On the axle are the striker-arms C³, carrying at each end a roller $b$, there being preferably two of these arms arranged to strike each plate C², as shown in Fig. 1.

Hinged to the under side of the forward portion of the main frame are the short arms D, connected by the cross-bar D', as shown in Fig. 1, and this cross-bar D' is arranged beneath the bars C' to be depressed thereby, as will be hereinafter set forth.

E are the seed-boxes arranged upon the side bars of the frame and provided in their bottoms with an aperture through which the seed is designed to drop onto the slide-plate E', which is provided with an opening E², designed to register with the opening in the bottom of the seed-box, as will be hereinafter set forth.

Attached to the forward cross-bar of the main frame and extending forward and thence bent backward, as shown in Fig. 2, with their points arranged in close proximity to the ground, are the spring-arms F, as shown more clearly in Fig. 2, and projecting rearward and upward from these spring-arms near their bends $c$ are the spring-bars F'.

G are the feed-spouts, of any known form, and arranged beneath the seed-boxes, as shown.

G' are spring-bars, attached at their upper ends to the rear of the seed-boxes and connected by the cross-bar G², the lower ends of the spring-bars G' serving to normally close the lower ends of the spouts, as shown in Fig. 2.

H is a cross-shaft at the rear of the main frame, and upon this shaft are the arms H', which are fulcrumed on said shaft, and extend forward into the path of the rollers $b$ on the striker-arms C³, as shown in Fig. 2.

I are arms on the rocker-shaft H and carrying at their rear ends the coverers I', which are each provided with an arm I², having a laterally-projecting pin $i$, to which is connected one end of a spring I³, the other end of which is connected with and coiled around a shaft or rod $i'$, connecting the two arms I, as shown more clearly in Fig. 1. To the inner sides of the inner ones of these arms I are the hooks $i^2$, to which is pivotally connected an arm $i^3$, having at its other end an eye which engages a staple or other like device I⁴ on the rear cross-bar of the main frame, the said arm $i^3$ being held to the staple by means of the coiled spring $i^5$, as shown in Fig. 1.

Any suitable means may be provided for throwing the machine into and out of gear. Many ways of accomplishing this are known, and I wish to be understood as not restricting myself to any special means therefor.

The operation is simple and will be readily understood. With the parts in the position in which they are shown in Fig. 2, as the machine is moved forward the revolution of the axle B will cause the striker-arms C³ to come in contact with the rear ends of the bars C', which as they are depressed come in contact with the cross-bar D', which bears upon the spring-bars F' and press them forward, forcing the openers into the ground and allowing the arms H' to fall, and this through the medium of the connecting mechanism hereinafter described between the shaft H and the slides E' moves said slides so as to allow the seed in the boxes to fall into the spouts, the lower ends of which at this time are closed by the ends of the spring-bars G'. The depression of the bars C' and spring-bars F' forces the points of the openers or arms F into the ground, opening a furrow. As the rollers b on the striker-arms C³ pass from the plates on the rear ends of the bars C' the natural tendency of the spring-arms causes them to return to their normal position, raising the points of the openers from the ground and forcing the slide-plates back to their normal positions. By this time the rollers on the striker-arms have come in contact with the spring-arms G' and move them away from the lower ends of the spouts, and thus allow the seed in said spouts to drop into the hole opened by the arms F, the machine by this time having moved forward such a distance as to bring the spouts over the holes thus made. In the further revolution of the axle the rollers on the striker-arms come into contact with the arms H' and lift them upward, thus throwing the coverers downward to cover the seed dropped into the furrow. As soon as the rollers have left the arms H' they are automatically returned to their normal position through the agency of their springs, above described. The parts are so arranged and the machine so timed that the furrow is opened, the seed dropped and covered in rapid succession, the machine moving forward just fast enough to allow the seed to be dropped in the holes made by the openers and to be covered by the coverers.

K is a ratchet-and-pawl mechanism for the purpose of allowing the shaft B to be turning when the machine is out of gear, for the purpose of turning the striker-arms C³, so as to drop the seed where it is desired to have the first hill, or to put it in check any time that it gets out of alignment. The striker-arms C³ are secured to their shafts by means of set-screws C⁷, which permit them to be adjusted on their shafts, so as to have them parallel with each other, as illustrated, or the two arms of each set at right angles to each other, so as to drop the seed twice as often as before. The slides E' are actuated by connections with the rock-shaft H. Any suitable connection may be provided for this purpose. In Fig. 1 I have shown one form at X.

What I claim as new is—

1. In a planter, the combination, with the openers, seed-slides, and coverers, of the striker-arms on the axle and intermediate devices between the openers and coverers for successively operating the openers, slides, and coverers, substantially as set forth.

2. In a planter, the combination, with the openers, the seed-slides, the coverers, and the means for closing the lower ends of the spouts, of the striker-arms on the axle, and the spring-arms connected with the slides and arranged to be actuated through the medium of the striker-arms, substantially as described.

3. In a planter, the combination with the axle, the striker-arms thereon, the openers, the slides, and the coverers, of the hinged arms arranged in the path of the strikers and adapted to actuate the openers, substantially as described.

4. In a planter, the combination of the axle, the striker-arms thereon, the slides, the openers, the hinged arms arranged in the path of the striker-arms, and the spring-arms connected with the openers and arranged to be actuated by the depression of the hinged arms to operate the slides, substantially as described.

5. In a planter, the combination, with the axle, the striker-arms thereon, the hinged arms arranged in the path of the striker-arms, and the short arms adapted to be depressed by the hinged arms, of the slides, and the spring-arms connected with the openers and with the slides and arranged to be actuated by the depression of said short arms, substantially as described.

6. In a planter, the combination, with the axle, the striker-arms thereon, the openers, and intermediate devices between the striker-arms and openers, of the coverers, and arms which cover the discharge ends of the spouts, and intermediate connections between said coverers, arms, and the striker-arms, substantially as and for the purpose specified.

7. In a planter, the combination, with the axle, the striker-arms thereon, the openers and slide actuated by the said striker-arms, and the arms H', arranged in the path of the striker-arms, of the coverers arranged to be actuated by the movement of said arms, and the connections between the coverers and the main frame, substantially as shown and described.

8. In a planter, the combination, with the axle and the striker-arms thereon, of the cross-shaft at the rear of the main frame, the arms H' on said shaft, the arms extending rearward from said shaft, the coverers carried by said arms, and the elastic connection between the coverers and the main frame, as set forth.

9. In a planter, the combination, with the axle, the main frame, the striker-arms, and the rollers thereon, of the cross-shaft at the rear of the main frame, the arms H' thereon in the path of the striker-arms, the spring-arms closing the lower ends of the spouts, the arms C', with their rear ends arranged in the path of the striker-arms, the said arms C', the spring-arms, and the arms H' all adapted to be actuated successively by the said striker-arms, substantially as and for the purpose specified.

In testimony whereof I affix my signature in presence of two witnesses.

EDWARD WALTER.

Witnesses:
 REUBEN WINFREE,
 W. W. RUCKER.